United States Patent

Rutherford et al.

[15] 3,638,192

[45] Jan. 25, 1972

[54] ASYNCHRONOUS PULSE INFORMATION CLOCK PHASE IMPARTED SHIFT REGISTER DECODER

[72] Inventors: Kenneth R. Rutherford; Lyle R. Strathman, both of Cedar Rapids, Iowa

[73] Assignee: Collins Radio Company, Dallas, Tex.

[22] Filed: July 6, 1970

[21] Appl. No.: 52,226

[52] U.S. Cl. ..........................340/168 R, 325/320, 325/325

[51] Int. Cl. ...................H04q 9/00, H04l 27/24, H04l 27/14

[58] Field of Search .............178/69, 69.5, 53.1; 179/15 BA; 340/167, 168, 170; 325/320, 325

[56] References Cited

UNITED STATES PATENTS 3,493,679 2/1970 Chomicki..........................325/325 X 3,512,087 5/1970 Lewis....................................325/320

3,526,717 9/1970 Himes et al. .......................325/320 X

*Primary Examiner*—Donald J. Yusko

*Attorney*—Warren H. Kintzinger and Robert J. Crawford

[57] ABSTRACT

An asynchronous data to clock phase scripted shift register encoder and time/phase decoder circuit with clock phase information in the shift register in the form of two clock period wide pulses or one clock period wide pulses depending on the asynchronous data being either in phase or out of phase respectively with the clock. The system enables a reduction in shift register elements by a factor of 2 to 1, maximizes the decoder gate aperture, and the time decoder is capable of determining the correct delay to within one-half a clock period while a conventional shift register decoder does so only to within one clock period.

20 Claims, 7 Drawing Figures

Figure 1:
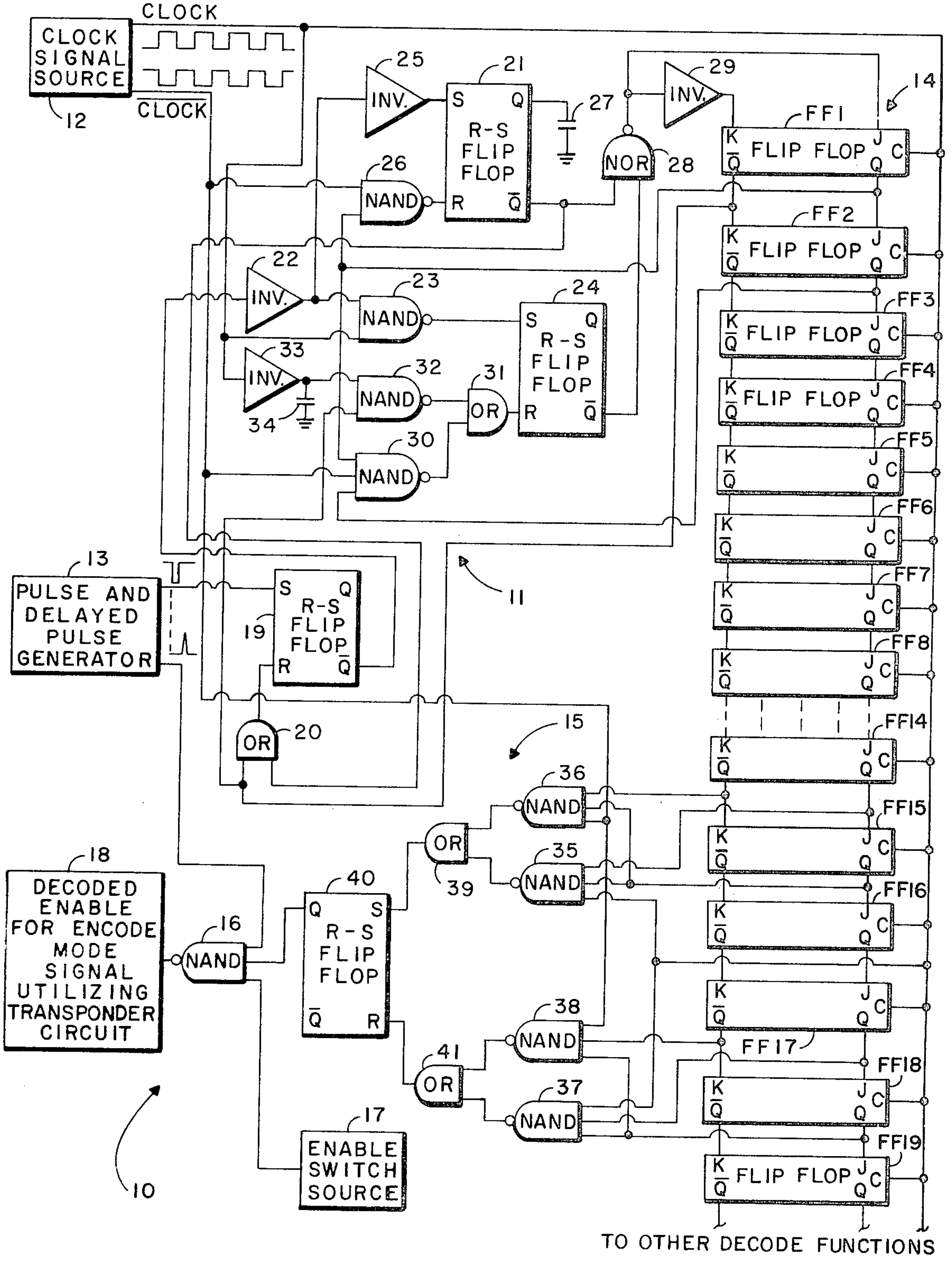

INVENTORS.
KENNETH R. RUTHERFORD
LYLE R. STRATHMAN
BY Warren H. Kintzinger
ATTORNEY INVENTORS.
KENNETH R. RUTHERFORD
LYLE R. STRATHMAN
BY Warren H. Kintzinger
ATTORNEY INVENTORS.
KENNETH R. RUTHERFORD
LYLE R. STRATHMAN
BY Warren H. Kintzinger
ATTORNEY

PATENTED JAN 25 1972 3,638,192

SHEET 4 OF 4

INVENTORS.
KENNETH R. RUTHERFORD
LYLE R. STRATHMAN
BY Warren H. Kintzinger
ATTORNEY

ASYNCHRONOUS PULSE INFORMATION CLOCK PHASE IMPARTED SHIFT REGISTER DECODER

This invention relates to information handling delay and control systems and, in particular, to an asynchronous input pulse to clock phase information encoded shift register to decoder system.

A conventional approach for decoding two or more pulse pairs with definite pulse spacings makes use of a lumped constant delay line and requires an expensive decoder from the standpoint of cost, weight, and space utilization. When the delay line approach is replaced with a conventional shift register approach, space and weight may be reduced but the cost is approximately the same. Use of applicants' asynchronous pulse information clock phase imparted shift register decoder system reduces the weight, cost, and space utilization of the delay line and conventional shift register approaches without sacrificing any of the accuracy attained in these methods of decoding. Not only does the asynchronous pulse information clock phase imparted shift register decoder system reduce the shift register elements by one-half compared to the conventional shift register decoder, thereby increasing shift register reliability by a factor of 2 to 1, but it also assures that substantially 100 percent of the pulse pairs will be decoded. In the conventional shift register approach some of the pulses are not entered into the shift register due to the asynchronous nature of the input pulses to the clock.

It is therefore a principal object of this invention to provide an asynchronous input pulse information clock phase imparted shift register and decoder system wherein substantially 100 percent pulse pair decoding is assured.

Another object with such an asynchronous input pulse information clock phase imparted shift register and decoder system is to attain such higher decoding results with a significantly improved decoder aperture as related to asynchronous to clock input signal pulse pairs with substantially no asynchronous input ever missed when asynchronous input pulses are sufficient to set the input flip-flop and no grater in width than one-half clock period.

A further object is to provide such an asynchronous input pulse information clock phase imparted shift register and decoder system that permits reduction of shift register elements by a factor of one-half as compared to otherwise conventional shift register decoder systems and with shift register reliability increased by a factor of substantially 2 to 1.

Another object with such an asynchronous input pulse information clock phase imparted shift register and decoder system is to attain space and weight reduction as well as cost savings along with improved operational results over other information pulse handling delay and decoding systems.

Features of the invention useful in accomplishing the above objects include, in an asynchronous input pulse information clock phase imparted shift register and decoder system, a shift register operating at one-half the clock rate of a conventional shift register, while maintaining substantially the same degree of time resolution, and with this accomplished with a system wherein the number of shift register elements is reduced to one-half that required in a conventional shift register. In this system input data that is asynchronous with respect to a clock signal reference is either in phase or out of phase with the clock, with, when the data is in phase, phase inscripted data being shifted through the shift register at a pulse width equivalent to two clock periods; and when the input data is out of phase, the data being shifted through the shift register at a pulse width equivalent to one clock period. Thus, the shifted pulses are time referenced to the input to within one-half a clock period. With the time/phase information contained in the delayed or shifted pulse down the shift register a time decoder determines the correct delay to within one-half a clock period, while, with a conventional shift register a time decoder determines the correct delay only to within one whole clock period.

A specific embodiment representing what is presently regarded as the best mode of carrying out the invention is illustrated in the accompanying drawings.

Figure 2:
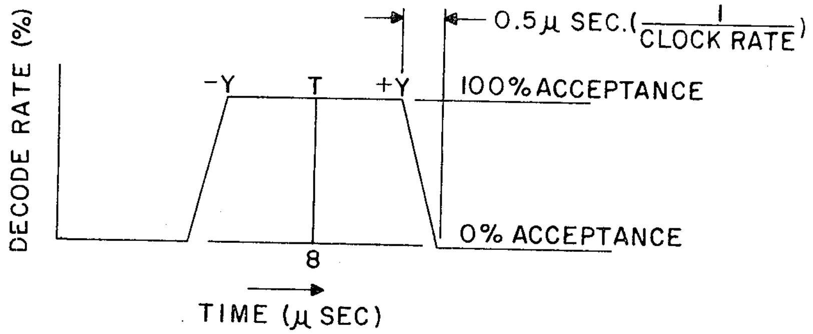
Figure 3:
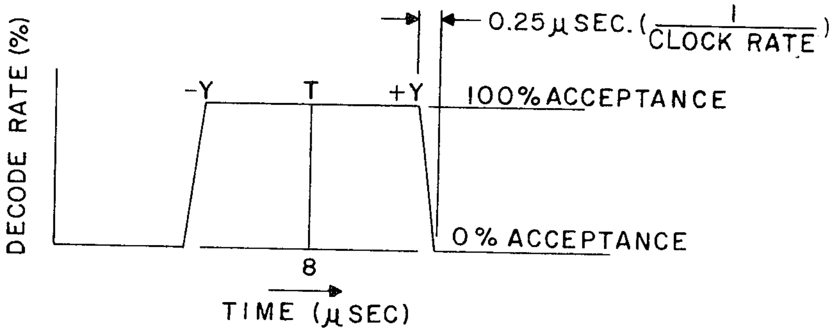
Figure 4:
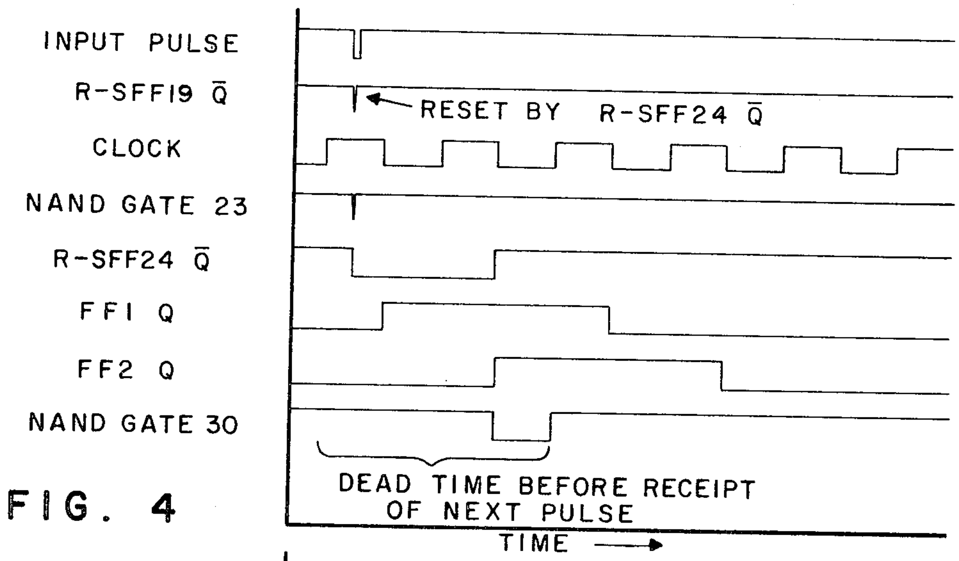
Figure 5:
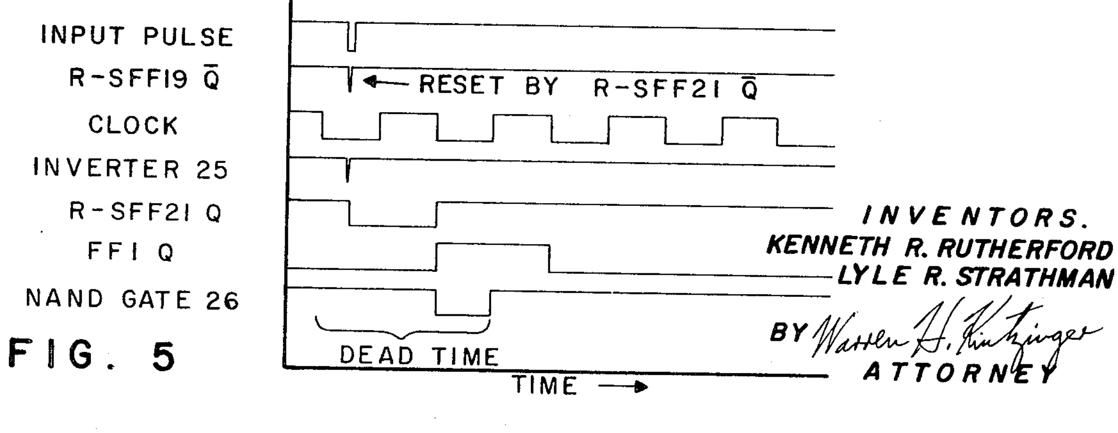
Figure 6:
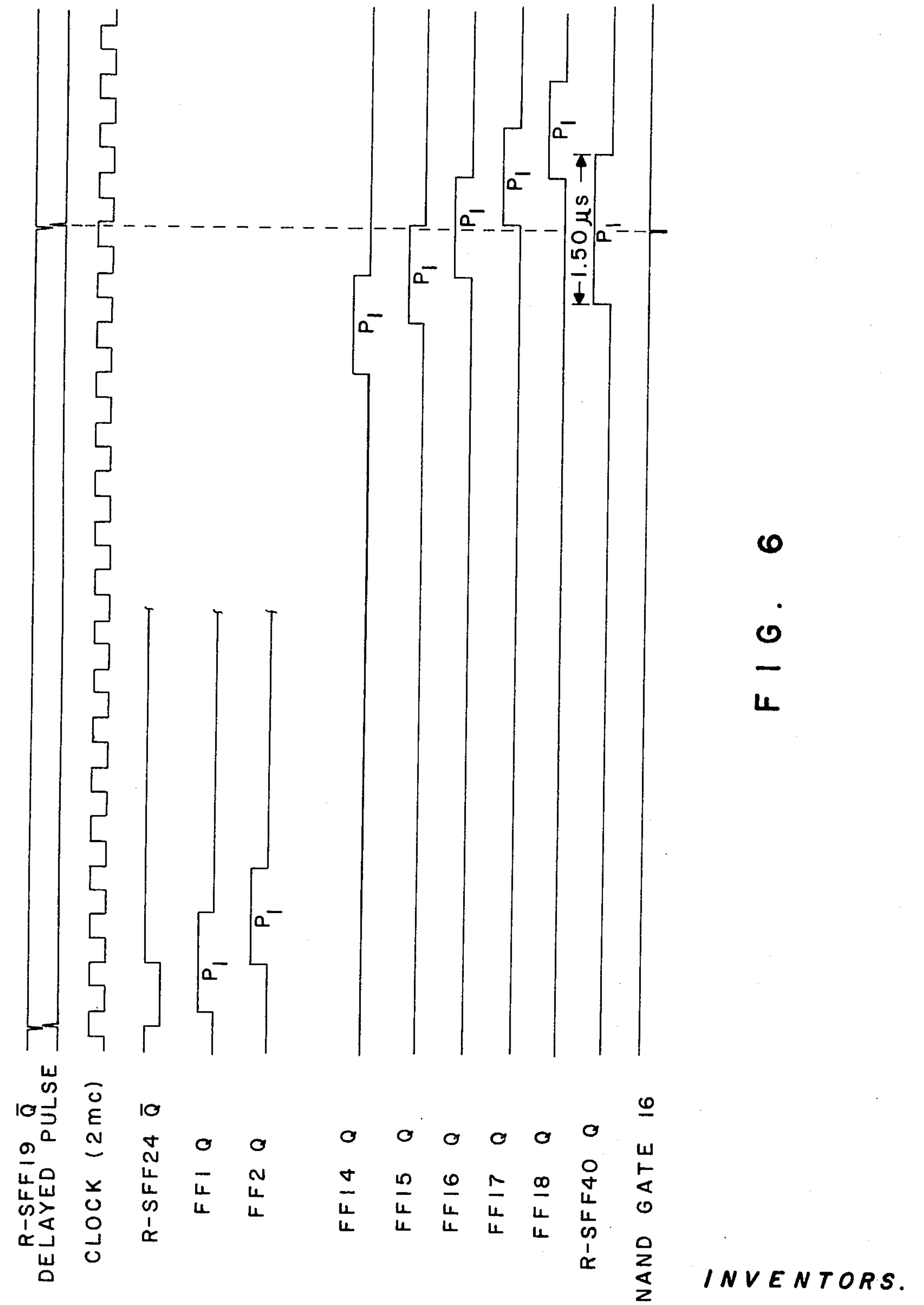
Figure 7:
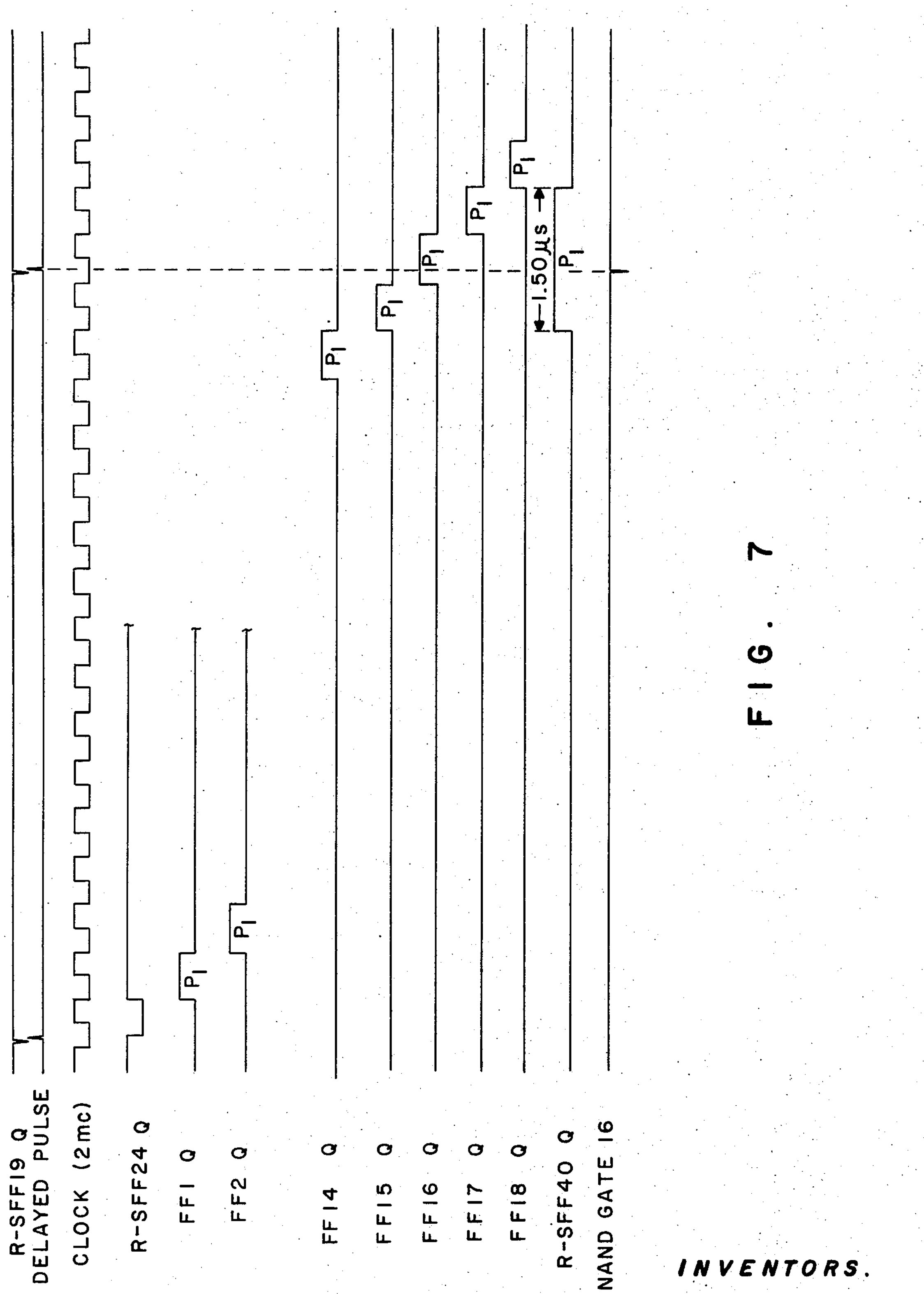

In the drawings:

FIG. 1 represents a general clock schematic diagram of applicants' asynchronous input pulse information clock phase imparted shift register and decoder system;

FIG. 2, a percentage of decoded pulse pairs as a function of pulse spacing and clock frequency decoder aperture curve for a conventional shift register decoder;

FIG. 3, a percentage of decoded pulse pairs as a function of pulse spacing and clock frequency decoder aperture curve for applicants' system;

FIG. 4, a family of waveforms for the asynchronous data clock phase shift register encoder circuit for the case with asynchronous input pulses out of phase with the clock;

FIG. 5, a family of waveforms for the asynchronous data clock phase shift register encoder circuit for the case with asynchronous input pulses out of phase with the clock;

FIG. 6, a family of waveforms of asynchronous 8 microsecond spaced input pulse pairs in phase with the clock and resulting two clock period width phase information inscripted waveforms appearing at specific locations down the shift register chain and decoder time/phase circuit gate waveforms; and FIG. 7, a family of waveforms of asynchronous 8 microsecond spaced input pulse pairs out of phase with the clock and resulting one clock period width phase information inscripted waveforms appearing at specific locations down the shift register chain and decoder time/phase circuit gate waveforms.

Referring to the drawings:

The asynchronous pulse information clock phase imparted shift register decoder system 10 of FIG. 1 is shown to include an asynchronous data clock phase shift register encoder circuit 11 receiving clock and inverted clock signals from clock signal source 12 and a negative going pulse from pulse and delayed pulse generator 13 with the pulse therefrom being asynchronous with respect to the clock signal from clock signal source 12. The asynchronous data to clock phase shift register encoder circuit 11, as shown in FIG. 1, includes the first two J-K flip-flops FF1 and FF2 of shift register 14. The shift register 14 is shown to feed, from different signal points time delayed down the chain, inputs to time/phase decoder circuit 15. The decoder circuit is also fed a delayed pulse from pulse and delayed pulse generator 13 to decoder output NAND-gate 16 that also receives an enable signal from enable switch source 17, a manual switch or switch operated by some other device. This is to enable ultimate outputs with signal coincidence from the time phase decoder circuit 15 to the NAND-gate 16 along with a pulse signal from the pulse and delayed pulse generator 13 and also from enable switch source 17 in providing an output signal pulse to decoded enable for encode mode signal utilizing transponder circuit 18.

Referring back to the asynchronous data clock phase shift register encoder circuit 11 an asynchronous negative going pulse signal, of a pulse pair with definite pulse spacing, from pulse and delayed pulse generator 13 is applied as a set input to R-S flip-flop 19 for developing a negative going $\overline{Q}$-output pulse that is terminated by a reset signal input from OR-gate 20, and with encoder circuit 11 delay determining $\overline{Q}$-negative going pulse width. OR-gate 20 is connected for receiving the $\overline{Q}$-output of J-K flip-flop FF1 and also the $\overline{Q}$-output of R-S flip-flop 21 in developing a negative going pulse from a positive voltage level to a substantially zero volt level upon there being an input to the OR-gate 20. The negative going $\overline{Q}$-output pulse of R-S flip-flop 19 is converted to a positive going pulse through inverter 22 that is applied as an input to NAND-gate 23. NAND-gate 23 also has the clock signal from clock signal source 12 applied as an additional input thereto to develop upon coincidence of the positive going pulses thereto a negative going pulse output from a positive voltage to substantially zero voltage level (since NAND-gate 23 is an inverting NAND gate) applied as a set input to R-S flip-flop 24. The positive going pulse output of inverter 22 is also applied to inverter 25 to develop a negative going pulse set input for R-S flip-flop 21. Inverted signal output NAND-gate 26 is provided with a $\overline{\text{clock}}$ input from clock signal source 12 and also a connection for receiving the Q-output signal of the first J-K flip-flop FF1 of the shift register 14 to develop a negative going pulse reset input signal for the R-S flip-flop 21. The Q-output of R-S flip-flop 21 is connected through capacitor 27 to ground in order that the $\overline{Q}$-negative going output of the R-S flip-flop 21 have a delayed onset and be a negative going pulse that is terminated by the start of the $\overline{\text{reset}}$ signal input from NAND-gate 26. This negative going $\overline{Q}$-output pulse of R-S flip-flop 21 is applied as an input to NOR-gate 28 and also through line connective means as an additional input to OR-gate 20 as a reset signal source for reset signals to the reset terminal of R-S flip-flop 19 via OR-gate 20. The positive going square wave output pulse of NOR-gate 28 that is extinguished whenever there is input from the $\overline{Q}$-output of R-S flip-flop 21 or from the $\overline{Q}$-output of R-S flip-flop 24 is passed directly as a "1" signal input to the J-input terminal of the first J-K flip-flop FF1 of the shift register 14 and this NOR gate output is also connected through inverter 29 to convert the positive going NOR-gate 28 output to a negative going "0" signal input to the K-input terminal of the first J-K flip-flop FF1 of the shift register 14. The Q-output of the first J-K flip-flop FF1 of the shift register 14 is connected as an input in addition to the $\overline{\text{clock}}$ input to NAND-gate 26 and also as an input to NAND-gate 30 that also has input connections from the $\overline{\text{clock}}$ signal line from clock signal source 12 and also from the Q-output of the second J-K flip-flop FF2 of the shift register 14. The negative going signal pulse output of NAND-gate 30 is connected as an input to OR-gate 31 having an output connection as the reset input to R-S flip-flop 24. The other input connection of OR-gate 31 is from the output of NAND-gate 32 that is connected for receiving one input from the Q-output of the first J-K flip-flop F1 of the shift register 14 and its other input from the output of clock signal fed inverter 33 with an output connection also through capacitor 34 to ground. Please note that in the shift register chain of J-K flip-flops FF1 successively through FF19, and beyond to other decode functions and uses intended, the Q-output of each J-K flip-flop is connected to the J-input of the following J-K flip-flop and in like manner the $\overline{Q}$-output is connected to the K-input of the next succeeding J-K flip-flop successively from the first J-K flip-flop FF1 through the shift register 14 to the final flip-flop of the shift register.

Down the shift register 14 the shift register is shown to be connected to time/phase decoder circuit 15 with operational inputs thereto including not only the $\overline{\text{clock}}$ and clock signals from clock signal source 12 but also signals from a five J-K flip-flop sequential portion of the shift register 14. This is with the Q-output of J-K flip-flop FF14 connected as an input to NAND-gate 35, with the $\overline{Q}$-output of J-K flip-flop FF14 connected as an input to NAND-gate 36, the Q-output of J-K flip-flop FF15 connected as an input to both NAND-gates 35 and 36, and the clock signal connected as an input from $\overline{\text{clock}}$ signal source 12 to both NAnD-gates 35 and 37. The $\overline{\text{clock}}$ signal of clock signal source 12 is connected as an input to both NAND-gate 36 and also as an input to NAND-gate 38. The outputs of NAND-gates 35 and 36 are connected as inputs to OR-gate 39 having an output connection to the set terminal of R-S flip-flop 40. The Q-output of J-K flip-flop FF17 is connected as an input to NAND-gate 37 and the $\overline{Q}$-output of J-K flip-flop FF17 is connected as an input to NAND-gate 38. The Q-output of J-K flip-flop 18 is connected as an input to both NAND-gates 37 and 38, and the outputs of NAND-gates 37 and 38 are connected as the inputs to OR-gate 41 having an output connection to the reset input terminal of R-S flip-flop 40 with the Q-output terminal thereof connected as an input to NAND-gate 16.

It may prove helpful at this point to recall that a basic purpose of applicants' asynchronous pulse information clock phase imparted shift register and decoder system 10 is to allow a shift register to operate at one-half the clock rate of what may be referred to as a conventional shift registers while maintaining substantially the same degree of time resolution, and that further, this is accomplished with the number of shift register elements reduced to one-half the number normally required in so-called conventional shift registers. With this improved system the shift register input data is either in phase or out of phase with the clock reference. When the asynchronous input data is in phase the data is shifted through the shift register at a pulse width equivalent to two clock periods, and when the asynchronous input data is out of phase, the data is shifted through the register at a pulse width equivalent to one clock period. Thus, obviously, the shifted pulses are time referenced to the input to within one-half a clock period. Then down the shift register by means of the time/phase information contained in the delayed or shifted pulse, a time decoder connected thereto can determine the correct delay to within one-half a clock period, whereas, a so-called conventional shift register time decoder can determine the correct delay to within only one clock period. Further, the resolution of a shift register is determined in large measure generally by its clocking rate, for example, the resolution of data in a shift register operating at 2 MHz. is 0.5 microsecond or one clock period with therefore asynchronous data entered into the shift register being resolved to within a clock period. With a 50–50 duty cycle being used and asynchronous data entered into the shift register in phase information modified form, data retrieval from the shift register may be resolved to within one-half the clock period, and with, for example, a 2 MHz. clocked shift register the retrieved data may be resolved to within 0.25 microseconds. This is with pulse width information informing the retrieval circuitry, that is the time/phase decoder circuit 15, whether the asynchronous input data was coincident with phase 1, the high of the clock waveform, or phase 2, the low of the clock waveform, as applied to the shift register 14 from shift register clock signal source 12.

The decode function used in a conventional shift register decoder will have a decoder aperture (pulse spacing accept criteria), as shown in FIG. 2, with the 100 percent accept range being T±Y microseconds. This is with T being any time corresponding to a specific pulse spacing to be decoded and ±Y indicating the required 100 percent accept range of the decoder. The time T for decoding a specific pulse spacing requires a clock rate and shift register length defined by T equal to the number of shift register elements divided by the clock rate. If, for example, it is desired to decode a pulse spacing of 8 microseconds (T) a clock rate of 2 MHz. would result in a 16-element shift register decoder to perform the 8-microsecond delay without providing for accept limit width. If the requirement for the 100 percent accept limit (±Y) were ±0.5 microseconds and the zero percent accept limits were ±1.0 microsecond the decode method described herein would require 18 shift register elements consistent with the block schematic showing of FIG. 1.

With, however, the requirements for ±Y approaching ±0.75 microseconds, as shown in FIG. 3, in lieu of ±0.5 microseconds as in the above example, the rise and fall time criteria is ±0.25 microseconds (1 over the clock rate) and necessitates, with a conventional shift register system, the use of 4 MHz. clock frequency. The 4 MHz. clock frequency would, in turn necessitate the use of 32 shift register elements, in a conventional shift register, for the 8-microsecond delay, and, with the decode method described herein, the requirement would be expanded to 36 shift register elements, or twice as many shift register elements as in the above example. However, the shift register decoder system described herein, utilizing unique asynchronous entry clock phase information imparting circuitry allows an 18 shift register 2 MHz. clocked decoder to perform within the same decoder aperture requirements that a conventional 36-element 4 MHz. clocked shift register decoder would allow. Such a marked improvement in utilization of a shift register decoder system, as attained with the system described herein, reduces the power consumption, cost, weight, and number of circuit elements that is otherwise required with conventionally designed shift register decoders.

In the actual implementation of the circuitry described herein, the decoder aperture obtained for the 100 percent accept points was advantageously 8±0.625 microseconds. The decoder aperture for the zero percent accept or 100 percent reject points was 8±0.875 microseconds. This decoder aperture results in a decoder gate aperture pulse having a jitter of only 250 nanoseconds while a conventional shift register decoder approach utilizing the same number of shift elements and the same clock frequency would have resulted in a jitter of 500 nanoseconds.

In the system for reducing the time difference jitter range from 500 to 250 nanoseconds in the preceding example between the 100 percent acceptance and the 100 percent reject (or zero percent acceptance) states the clock phase at the time of a shift register input signal pulse is determined and inscripted to data pulses imparted to the shift register 14. Referring back again to the schematic block diagram of FIG. 1 and assuming the asynchronous input pulse is in phase with the clock the input pulse sets the $\overline{Q}$-output of R-S flip-flop 19 to a "1" state, and this $\overline{Q}$-output of flip-flop 19 is in coincidence with the clock as inverted through inverter 22 into NAND-gate 23 to develop a negative going pulse output therefrom applied as a set input signal to R-S flip-flop 24. This sets the $\overline{Q}$-output of the R-S flip-flop 24 to a "0" state that is applied as a zero voltage input signal to NOR-gate 28. This NOR-gate 28 feeds a "1" signal to the J-input of the first J-K flip-flop FF1 of shift register 14 and the NOR gate output is applied through inverter 29 as a "0" signal to the K-input of flip-flop FF1. Using J-K flip-flops through the shift register 14 that change state on the negative go down of the clock applied to the C terminals thereof NAND-gate 30 generates a reset trigger input through OR-gate 31 to R-S flip-flop 24 only when $\overline{clock}$ and the Q-output of J-K flip-flop FF1 and the Q-output of J-K flip-flop FF2 are all in coincidence. This operational state is further illustrated by the waveforms of FIG. 4 with input pulses in phase with the clock resulting in the generation of shift register bits or pulses that are two clock periods in duration. Please note at this point that the $\overline{Q}$-output of R-S flip-flop 19 is width determined by loop delay through NAND-gate 23, R-S flip-flop 24, NOR-gate 28, inverter 29 and the R-S flip-flop 19 itself as well as other component elements within the operational loop.

With reference to the opposite case where the asynchronous input pulse is out of phase with the clock please refer to the family of waveforms of FIG. 5. In this out of phase operational state R-S flip-flop 21 is caused to generate a $\overline{Q}$-output pulse and the R-S flip-flop is reset by the output of NAND-gate 26 with the respective related waveforms being as set forth in FIG. 5. Asynchronous input pulses out of phase with the clock generate shift register bits or pulses that are one clock period in duration. Here again in this case the pulse width of R-S flip-flop 19 $\overline{Q}$-output is determined by the delay through inverter 22, inverter 25, R-S flip-flop 21, NOR-gate 28, inverter 29 and the R-S flip-flop 19 itself along with the delay of other circuit elements within the operational loop involved.

Please note that the asynchronous input pulse from pulse and delay pulse generator 13 applied to the set input terminal of R-S flip-flop 19 need be no greater in width than that necessary to set the input flip-flop 19 and it must be no greater in width than one-half clock period. Within this system data from the input flip-flop 19 is used to take advantage of the inhibiting reset functions imparted to the reset input to flip-flop 19. Data passed through inverter 22 and therefrom through inverter 25 and also in parallel therewith to NAnD-gate 23 together present equal logic delays to the inputs passed thereby to phase storage flip-flops 21 and 24. PUlses from inverter 22 always set phase 2 flip-flop 24 that inputs pulses to the shift register that are one clock period wide. This phase 2 flip-flop 24 acts as a storage element until it is certain that the pulse has been entered into the shift register 14, that is, phase 2 flip-flop 24 is reset by the Q-output of FF1 and clock low when the clock changes state from high to low with data then entered into FF1. With such operational action in allowing phase 2 flip-flop 24 to be set for each entry pulse, no asynchronous input is ever missed. But for these provisions there would be a possibility of missing asynchronous pulses due to finite rise and fall times of the pulses. Further, pulses from inverter 22 in addition to setting the phase 2 flip-flop 24, set phase 1 flip-flop 21 if the entry data is in phase with clock high. This phase 1 flip-flop 21 stores the data for two clock periods thereby forming shift register pulses that are two clock periods wide. The phase 2 flip-flop 24 is reset by Q-outputs of FF1 and FF2 of the shift register 14 and $\overline{clock}$ to NAND-gate 30. With reference again to finite rise and fall times on the pulses and because of logic element delays, some harmful effects result if these delays are not countermanded. If phase 2 flip-flop 24 is set but the shift register 14 does not accept the data on the first clock signal following, NAND-gate 32 output resets the flip-flop 24 via $\overline{Q}$-output of FF1 and inverter 33. Capacitors 27 and 34 allow for delay between the time the clock goes from high to low and the $\overline{Q}$-output appears from FF1 of the shift register 14. Still further, input flip-flop 19 is reset and inhibited whenever a $\overline{Q}$-pulse appears out of the first FF1 shift register 14 element or in phase 2 flip-flop 24, thereby imposing a requirement upon the system that two asynchronous inputs shall be separated by at least one clock period.

Referring now to FIG. 6, a family of waveforms is shown related to asynchronous 8 microseconds spaced input pulse pairs in phase with the clock with waveform pulses in the shift register 14 being two clock period width phase information inscripted waveforms. The negative going pulse pair output appearing at the $\overline{Q}$-output terminal of R-S flip-flop 19 resulting from an 8 microsecond spaced pulse pair asynchronous signal input from pulse and delayed pulse generator 13 to the set terminal of R-S flip-flop 19 are shown. Further, the relation of short interval delayed pulses, from each of the pulses in the pulse pair out of pulse and delayed pulse generator 13, that are fed to NAND-gate 16 are also shown. Please note that enable switch source 17 may be a manually operated switch or an automatically operated switch to feed an input to NAND-gate 16 therefrom. Then whenever there is a Q-output from R-S flip-flop 40 as a decoder gate, coincidence therewith by a delayed pulse out of pulse and delayed pulse generator 13 results in a negative going output pulse, from a positive voltage level to substantially zero volts, being passed from NAND-gate 16 to decoded enable for encode mode signal utilizing transponder circuit 18. Just as has been explained hereinbefore with reference to the waveforms of FIG. 4 with asynchronous input signal pulses in phase with the clock the R-S flip-flop 24 $\overline{Q}$-output develops a negative going pulse, as initiated by the first asynchronous input pulse of the asynchronous input pulse 8 microsecond spaced pair, that is held until the reset of the R-S flip-flop 24 is activated. The action of the asynchronous data clock phase shift register encoder circuit 11 including the first two flip-flops FF1 and FF2 of shift register 14 produces the two clock period wide shift register element pulse waveforms such as portrayed with respect to FF1 Q, FF2 Q and FF14 Q through FF18 Q, and with it understood that the intervening shift register elements flip-flops FF3 through FF13 develop intervening correspondingly successive clock period step delayed positive going pulses down the shift register train successive element by element. The resulting decoder gate 1.50 microsecond wide positive going pulse appearing at the Q-output of R-S flip-flop 40 presents a relatively wide decoder aperture gate, or pulse spacing accept criteria, to permit a negative going pulse to be developed out of NAND-gate 16 should a delayed positive going pulse output appear out of the pulse and delayed pulse generator 13 within the decoder aperture. With the time/phase decoder circuit 15 the decoder gate is initiated with the logic expression FF14 Q·FF15 Q·clock for the two clock period cycle signal pulse wide state down the shift register 14 consistent with asynchronous input pulses being in phase with the clock. The decoder gate is also initiated with logic FF14 $\overline{Q}$·FF15 Q·$\overline{clock}$ for the one clock period cycle signal pulse width state down the shift register 14 consistent with asynchronous input pulses being out of phase with the clock. Please refer also to FIG. 7 for a showing of the one clock period width waveforms down the shift register for the asynchronous input out of phase to clock state of operation. These respective waveform families also result in termination of the decoder gate out of R-S flip-flop 40 Q with the logic expression FF17 $\overline{Q}$·FF18 Q ·$\overline{clock}$ for the asynchronous input data in phase with clock condition of FIG. 6 with the two clock width pulses developed by elements down the shift register 14, or, alternately, logic expression FF17 Q·FF18 Q·clock for the asynchronous data out of phase with clock operational state and the shift register element one clock period pulse waveforms of FIG. 7. Development of the decoder gate at the Q-output of R-S flip-flop 40 guards against voids that could occur otherwise when successive shift register outputs would be OR'd together.

Whereas this invention is herein illustrated and described with respect to a specific embodiment hereof, it should be realized that various changes may be made without departing from the essential contributions to the art made by the teachings hereof.

We claim:

1. In an asynchronous pulse information clock phase imparted shift register decoder circuit: an input data signal source; a clock signal source; a multi-flip-flop element shift register; with connections between individual shift register flip-flop elements and said clock signal source; an asynchronous data to clock phase information shift register signal pulse width varying encoder circuit means interconnecting said input data signal source and said multi-flip-flop element shift register, and with input data from said signal source being asynchronous with respect to said clock, with said encoder circuit means being shift register element signal pulse width varying means by clock period increments as determined by the asynchronous input data signal being in phase with or out of phase with the clock; time/phase decoder logic function reactive circuit means connected to flip-flop output terminals at several locations down the shift register chain logic function reactive to signal pulses at the several locations down the shift register chain in developing a decoder circuit gate aperture; and connection of said input data signal source to a gate decoder gate aperture controlled for passage therethrough of signals from said input data signal source.

2. The asynchronous pulse information clock phase imparted shift register decoder circuit of claim 1, wherein each flip-flop element of the multi-flip-flop element shift register has an incremental time delay of one clock period of the clock used for clock stepping data through the shift register; and with output means of at least one flip-flop element of the multi-flip-flop element shift register connected back to said encoder circuit for logic time inscripted variation of data input to the shift register by gating logic control means in said encoder circuit.

3. The asynchronous pulse information clock phase imparted shift register decoder circuit of claim 2, wherein said clock is also connected to logic circuitry of said encoder circuit; and including a first information storing set and reset device; a second information storing set and reset device; with the first set and reset device being logic controlled for greater than one clock period output with the asynchronous pulse input signal being in phase with the clock; and with said second set and reset device being logic controlled for less than one clock period output with the asynchronous pulse input signal being out of phase with the clock.

4. The asynchronous pulse information clock phase imparted shift register decoder circuit of claim 3, wherein there is output signal connective means from the first flip-flop element of said shift register back through logic circuitry of said encoder circuit to input connective means of both said first and second set and reset devices; and with output signal connective means from the second flip-flop element of said shift register through logic circuitry of said encoder circuit to the reset input of said first set and reset device.

5. The asynchronous pulse information clock phase imparted shift register decoder circuit of claim 4, wherein said first and second set and reset devices are flip-flops in the said encoder circuit.

6. The asynchronous pulse information clock phase imparted shift register decoder circuit of claim 5, wherein said flip-flops in said encoder circuit are R-S flip-flops with a connection through a capacitor to ground from a Q-output of said second R-S flip-flop.

7. The asynchronous pulse information clock phase imparted shift register decoder circuit of claim 6, wherein said encoder circuit includes a third R-S flip-flop device as a signal input flip-flop with said input data signal source having a signal connection to the set terminal of said third R-S flip-flop, reset connection through gate means from an output of said second R-S flip-flop and from an output of said first flip-flop of the shift register, and output connection through logic circuitry to set inputs of both said first and second R-S flip-flops of the encoder circuit.

8. The asynchronous pulse information clock phase imparted shift register decoder circuit of claim 7, wherein said clock is connected through a buffer device to a NAND gate output OR'd with other logic connections to the reset terminal of said first R-S flip-flop of the encoder circuit.

9. The asynchronous pulse information clock phase imparted shift register decoder circuit of claim 8, wherein the junction of said buffer device to a NAND gate is connected through a capacitor to ground.

10. The asynchronous pulse information clock phase imparted shift register decoder circuit of claim 5, wherein logic outputs of said first and second flip-flops of said encoder circuit are alternately gated to shift register input, as determined by input asynchronous data pulse phase or out of phase states with the clock; with shorter than one clock period pulses clock stepped through said shift register; and with greater than one clock period logic signal out of said first flip-flop converted to two clock period pulses clock stepped through said shift register.

11. The asynchronous pulse information clock phase imparted shift register decoder circuit of claim 10, wherein said input data signal source supplies input data to said encode circuit in the form of pulse pairs having substantially uniform spacing between pulses of each pair of pulses and with the pulse pairs asynchronous with reference to the clock; and with pulse pair spacing determinative, as related to clock frequency, of position of connection of said time/phase decoder circuit means to flip-flop output terminals down the shift register chain.

12. The asynchronous pulse information clock phase imparted shift register decoder circuit of claim 11, wherein said time/phase decoder circuit includes a set reset decoder gate aperture output device; an initiate logic circuit connected to first flip-flop output means in said shift register and to said clock signal source, and as input means to the set input terminal of said set reset decoder gate aperture output device; and a terminate logic circuit connected to second flip-flop output means in said shift register and to said clock signal source, and as input means to the reset input terminal of said set reset decoder gate aperture output device.

13. The asynchronous pulse information clock phase imparted shift register decoder circuit of claim 12, wherein said set reset decoder gate aperture output device is an R-S flip-flop; said initiate logic circuit is connected to said shift register before the shift register output connection to said terminate logic circuit.

14. The asynchronous pulse information clock phase imparted shift register decoder circuit of claim 13, wherein inverted clock is also connected to both said initiate logic and said terminate logic circuits of said time phase decoder circuit.

15. The asynchronous pulse information clock phase imparted shift register decoder circuit of claim 14, wherein the flip-flop elements of said shift register are J-K flip-flops each including J, K, and clock input terminals and having Q and $\overline{Q}$-output terminals.

16. The asynchronous pulse information clock phase imparted shift register decoder circuit of claim 14, wherein with a five flip-flop segment of the shift register the Q and $\overline{Q}$-outputs of the first flip-flop of the segment, and the Q-output of the fifth flip-flop of the segment are connected as inputs to said terminate logic circuit.

17. The asynchronous pulse information clock phase imparted shift register decoder circuit of claim 16, wherein the asynchronous input pulse pairs have 8 microsecond spacing; the clock is a 2 MHz. clock; and the third flip-flop of said five flip-flop segment is the sixteenth flip-flop down the shift register from the first shift register flip-flop receiving an input from said encoder circuit.

18. The asynchronous pulse information clock phase imparted shift register decoder circuit of claim 16, wherein an output of said decoder circuit output R-S flip-flop is connected to aperture gate control an output gate to pass for utilizing circuitry signals falling therein passed from said input data signal source through a connection therefrom to said output gate.

19. The asynchronous pulse information clock phase imparted shift register decoder circuit of claim 18, wherein said input data signal source is a pulse pair and delayed pulse asynchronous to clock signal originating source, and with delayed pulse signal connective means therefrom connected to said output gate.

20. The asynchronous pulse information clock phase imparted shift register decoder circuit of claim 19, wherein said output gate is a NAND gate; and enable switch means also connected as an input to said NAND gate.

* * * * *

UNITED STATES PATENT OFFICE
CERTIFICATE OF CORRECTION

Patent No. 3,638,192 Dated January 25, 1972

Inventor(s) Kenneth R. Rutherford and Lyle R. Strathman

It is certified that error appears in the above-identified patent and that said Letters Patent are hereby corrected as shown below:

Column 3, line 34, delete "F1" and substitute therefor --FF1--; line 55, delete "NAnD" and substitute therefor --NAND--; column 5, line 65, delete "NAnd" and substitute therefor --NAND--; line 67, delete "PUlses" and substitute therefor --Pulses--; column 8, line 34, after "period" insert --logic signal out of said second flip-flop converted to one clock period--; column 9, line 5, after "the" (first occurrence) insert --second flip-flop of the segment are connected as inputs to said initiate logic circuit; and the Q and $\overline{Q}$ outputs of the fourth flip-flop of the segment,and the Q output of the--.

Signed and sealed this 15th day of August 1972.

(SEAL)
Attest:

EDWARD M FLETCHER, JR.
Attesting Officer

ROBERT GOTTSCHALK
Commissioner of Patents